United States Patent [19]

Lowry et al.

[11] Patent Number: 4,781,853

[45] Date of Patent: Nov. 1, 1988

[54] METHOD OF ENHANCING SILICON ETCHING CAPABILITY OF ALKALI HYDROXIDE THROUGH THE ADDITION OF POSITIVE VALENCE IMPURITY IONS

[75] Inventors: Robert K. Lowry, Melbourne Beach; Edward U. Adams, Melbourne, both of Fla.

[73] Assignee: Harris Corp., Melbourne, Fla.

[21] Appl. No.: 936,609

[22] Filed: Dec. 1, 1986

[51] Int. Cl.$^4$ .............................................. C09K 13/02
[52] U.S. Cl. ................................. 252/79.5; 156/657; 156/662; 252/79.2
[58] Field of Search .............. 156/662, 657; 252/79.5, 252/79.2; 134/2, 3

[56] References Cited

U.S. PATENT DOCUMENTS

| | | | |
|---|---|---|---|
| 2,902,419 | 9/1959 | Carasso et al. | 204/129.85 |
| 4,579,591 | 4/1986 | Suzuki et al. | 101/465 |
| 4,601,783 | 7/1986 | Krulik | 252/79.5 |
| 4,601,784 | 7/1986 | Krulik | 252/79.5 |

FOREIGN PATENT DOCUMENTS

| | | | |
|---|---|---|---|
| 2376222 | 12/1976 | France | 252/79.5 |
| 1015975 | 7/1974 | Japan | 252/79.5 |

OTHER PUBLICATIONS

IBM Technical Disclosure Bulletin "Selective Etchart for N-Type Silicon" Muraszkiewski vol. 13, No. 10, Mar., 1971.

Primary Examiner—David L. Lacey
Assistant Examiner—L. Johnson
Attorney, Agent, or Firm—Antonelli, Terry & Wands

[57] ABSTRACT

The ability of alkali hydroxide to etch silicon is enhanced by the controlled addition of metallic salts which readily dissociate in a strong base (pH≧10) solution. When introduced into the alkali hydroxide (e.g. potassium hydroxide) solution, the controlled concentrations of additive metallic ions increase the electronegativity of the solution and thereby enhance its ability to attract electrons away from the silicon atoms within the crystal lattice being etched. By adding controlled levels of properly chosen electropositive ions, the rate at which the electrons are removed from the silicon atoms in the surface planes of the crystal lattice that are exposed to the etching solution can be controllably increased. As a result of removal of the electrons from the silicon atoms, the silicon atoms dissolve out of the crystal planes at rates modified by the degree of impurity addition, resulting in improved etching charcteristics and geometries over that of conventionally employed alkali hydroxide solution.

6 Claims, 1 Drawing Sheet

METHOD OF ENHANCING SILICON ETCHING CAPABILITY OF ALKALI HYDROXIDE THROUGH THE ADDITION OF POSITIVE VALENCE IMPURITY IONS

FIELD OF THE INVENTION

The present invention relates in general to the manufacture of semiconductor devices and is particularly directed to an alkali hydroxide solution whose ability to etch silicon is enhanced by the addition of positive valence ions.

BACKGROUND OF THE INVENTION

The manufacture of semiconductor integrated circuits typically involves highly complex, time consuming and costly processes which, with continually narrower line width requirements, must be achieved with an ever increasing degree of precision. Within such processes the etching of semiconductor material (e.g. silicon) often entails the use of a chemical bath to which masked semiconductor material is exposed, so as to etch moats or trenches in the surface of a wafer. In a typical chemical etch process, both the rate of etch and the depth of etch are parameters critical to the successful formation of an intended substrate topography. While it is desirable to enhance these parameters in order to reduce overall processing time and cost, it is necessary to maintain accurate control over etch rate and depth, so that the target surface geometry will be achieved. To this end, for etching moats in a silicon wafer, commercially available alkali hydroxide solution (e.g. potassium hydroxide (KOH) solution) typically having a controlled strength on the order of 45.0% w/w, (w/w=weight of alkali hydroxide/weight of aqueous ($H_2O$) solution) is routinely used, because of its ability to provide well established and reproducible silicon etch rates, depths and moat geometries. Undesirably, however, these performance characteristics are limited (etch rate on the order of 0.022–0.036 mil/min and etch depth on the order of 0.5 to 5 mils), so that the overall wafer fabrication process in which such an etching solution is employed is necessarily constrained.

SUMMARY OF THE INVENTION

In accordance with the present invention, the silicon-etching performance limitations of conventional alkali hydroxide solution are substantially reduced by the controlled addition of etch-enhancing impurities for improving both the rate of etch and depth of etch in silicon. The impurities are selected on the basis of the electronic structure of their component positive ions and the solubility of a salt containing such impurities in the alkali hydroxide solution. When introduced into alkali hydroxide solution, the controlled concentrations of additive ions increase the electronegativity of the solution and thereby increase or enhance its ability to attract electrons away from the silicon atoms within the crystal lattice being etched. By adding controlled levels of properly chosen electropositive ions, the rate at which the electrons are removed from the silicon atoms in the surface planes of the crystal lattice that are exposed to the etching solution can be controllably increased. As a result of removal of the electrons from the silicon atoms, the silicon atoms dissolve out of the crystal planes at rates modified by the degree of impurity addition, resulting in improve etching characteristics and geometries over that of conventionally employed alkali hydroxide solution.

The addition of positive valence ions is accomplished by dissolving metallic salts which ready dissociate in a strong base solution (e.g. pH>10) and increase the electronegativity of the alkali hydroxide solution and thereby enhance its ability to etch silicon. In the present description, the phrase "readily dissociate" is to be understood to correspond quantitatively to a solubility in basic solution on the order of 4.0 g/100 ml or greater, representative of the extent or ease to which the respective ionic components of a molecule of a metallic salt compound come apart or separate into respective cation and anion components in solution. Examples of metallic salts that will readily dissociate in a strong base to provide positive valence ions include those containing barium ($Ba^{2+}$), lanthanum ($La^{3+}$) and tin ($Sn^{4+}$). Salts such as barium nitrate ($Ba(NO_3)_2$), lanthanum chloride ($LaCl_3.7H_2O$) and stannic chloride ($SnCl_4.5H_2O$), which contain these ions, readily dissociate in a strong base solution and they dissolve readily in commercially available alkali hydroxide solution (e.g. potassium hydroxide solution (pH≧13)) without leaving precipitates. The anion species added to the alkali hydroxide solution, i.e. nitrate, chloride, etc., does not materially impact the characteristics of the silicon being etched.

In accordance with a preferred embodiment of the invention, an aliquot of a metallic salt (such as barium nitrate, lanthanum chloride, or tin chloride) is added to an alkali hydroxide solution (e.g. alcoholic potassium hydroxide solution (45.0% w/w) such that the working solution contains the metallic (barium ($Ba^{2+}$), lanthanum ($La^{3+}$) or tin ($Sn^{4+}$)) ions in a concentration range of 50 ppm–5,000 ppm. As a result, an increase in etch depth of as much as 0.5 mils beyond the capability of conventional alkali hydroxide solutions is attainable while, at the same time, maintaining or producing the desired moat geometry (specifically the production of corners with less rounded edges).

DETAILED DESCRIPTION

As pointed out previously, the present invention involves the controlled addition of a metallic salt into an alkali aqueous solution (e.g. alcoholic potassium hydroxide), which is easily ionized in the solution and thereby increases aqueous electronegativity of the solution, so that the ability of its ionic components, specifically, its cation component (e.g. $K^+$ for a KOH solution) to attract electrons from the silicon is augmented or supplemented by the cation component of the dissolved salt. Thus the added metallic salt cations increase the electronegativity of the solution and thereby enhance its ability to remove electrons from silicon atoms in the surface planes of the crystal lattice of silicon being etched by the solution and thereby provides an enhanced etch of the silicon. For this purpose, alkaline-soluble metallic salts which readily dissociate in a strong base solution (pH >10) are selectively added to a strong base alcoholic alkali hydroxide (e.g. potassium hydroxide) solution (e.g. 45.0% w/w of KOH, pH>13) in a concentration range of 50 ppm–5,000 ppm. Examples of metallic ions and salts of such ions which readily dissociate in a strong base solution and thereby enhance the electronegative characteristics of potassium hydroxide solution are listed in Table I below.

TABLE I

| GROUP NO. | ION | VALENCE | SALT |
|---|---|---|---|
| II | Barium | $Ba^{2+}$ | Barium hydroxide, $Ba(OH)_2$ |
| II | Barium | $Ba^{2+}$ | Barium nitrate, $Ba(NO_3)_2$ |
| III | Lanthanum | $La^{3+}$ | Lanthanum chloride, $LaCl_3.7H_2O$ |
| IV | Tin | $Sn^{4+}$ | Stannic chloride, $SnCl_4.5H_2O$ |

Each of the salts listed in Table I is compatible with and readily dissolves in commercially available alcoholic potassium hydroxide solution. As a result, each salt, when dissolved, provides a quantity of dissociated cations which increase the electronegativity of the solution and thereby increase its attraction for electrons in the crystal lattice of the silicon. The anion species which is added to the solution (i.e. the nitrate, chloride, etc.) has no observable material effect on the etched silicon characteristics. The concentration of the cation species, on the other hand, ($Ba^{2+}$, $La^{3+}$, $Sn^{4+}$) affects the silicon characteristics by providing a strong attraction to the electrons away from the silicon atoms and thereby enhances the silicon-dissolving properties of the potassium hydroxide solution. As can be seen from Table I, each cation species preferrably has a positive valence of +2 or greater.

Figure 1:
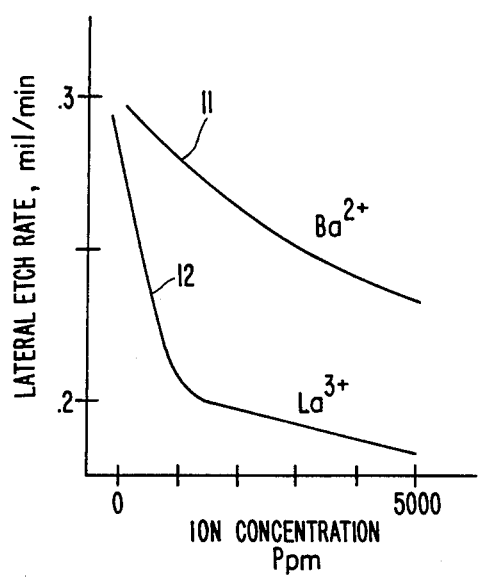
FIG. 1 is a graphical illustration of respective curves representative of the lateral etch rate of ion-enhanced potassium hydroxide in terms of ionic concentration of barium and lanthanum.
Figure 2:
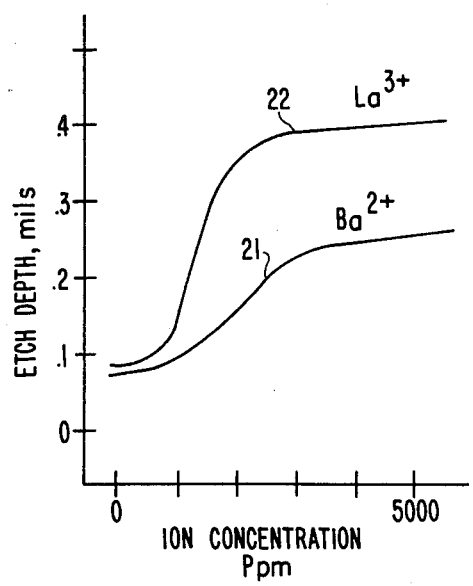
FIG. 2 is a graphical illustration of respective curves representative of the depth of etch in silicon of ion-enhanced postassium hydroxide in terms of ionic concentration of barium and lanthanum.

As will be explained in detail below with reference to FIGS. 1 and 2, this controlled removal of the electrons from the silicon ions (corresponding to the electronegativity of the cation component of the dissolved salt) is more enhanced for cations of increased valence. Table II below lists the ionization potentials and electronegativities for the sequence of cations listed in Table I.

TABLE II

| SPECIES | VALENCE | I | II | III | ELECTRONEGATIVITY |
|---|---|---|---|---|---|
| Ba | +2 | 5.19 | 9.95 | — | 0.9 |
| La | +3 | 5.6 | 11.4 | 20.4 (estimate) | 1.1–1.2 |
| Sn | +4 | 7.3 | 14.5 | 30.5 | 1.9 |

The increasing values of ionization potential and electronegativity with increasing positive valence as tabulated in Table II indicates the relative ease with which electrons are removed from the neutral silicon atom. Reference numerals I, II and III correspond to respective shell orbitals of the electronic structure of the ionic specie. Conversely, these values are an indication of the attractive force that each species has for electrons in solution, i.e. $Sn^{4+}$ ions are more strongly attractive to electrons than $La^{3+}$ ions which, in turn, are more strongly attractive to electrons than $Ba^{+2}$ ions. As can be seen from Table II the ionization potential of each cation species is greater than five. The progression in etching enhancements by adding ions of increasingly electropositive valence may be further understood by considering the enthalpies and Gibbs energies of the compounds and the ions which result upon dissociation of these compounds in aqueous alkaline solution.

Table I, referenced supra, lists examples of salts that may be used as a source of the electropositive ions for etch enhancement. The dissociations of these salts in aqueous alkaline solution, as well as the dissociation of the intrinsic etching ingredient potassium hydroxide, may be described by the following equations:

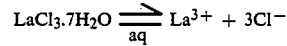

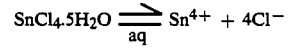

A tabulation of the enthalpies ($\Delta H$) and Gibbs energies ($\Delta G$) for these species is given in Table III below. All values were obtained from the Table of Selected Values of Chemical Thermodynamic Properties, CRC Handbook of Chemistry and Physics, 65th Edition, pp D50–D93.

TABLE III

| COMPOUND | $\Delta H$ | $\Delta G$ (nl = not listed) |
|---|---|---|
| KOH | −115.29 | −105.29 |
| $Ba(OH)_2$ | −225.8 | nl |
| $Ba(NO_3)_2$ | −227.62 | −187.24 |
| $LaCl_3.7H_2O$ | −759.7 | −648.5 |
| $SnCl_4.5H_2O$ | −152.5 | −124.9 |
| ION | | |
| $K^+$ | 122.92 | −67.70 |
| $Ba^{2+}$ | 396.86 | −134.02 |
| $La^{3+}$ | 933.2 | −169.0 |
| $Sn^{4+}$ | nl | nl |

It is to be noted that the $\Delta H$ and $\Delta G$ values for $SnCl_4.5H_2O$ do not follow the evident trend for the other compounds. Presumably, the fact that tin behaves predictably with regard to the other compounds is explained by its much larger electro-negativity, which is almost twice that of the barium and lanthanum compounds. $\Delta H$ values for $Sn^{1+}$, $Sn^{2+}$, and $Sn^{3+}$ are 243.04, 581.95, and 1287.4, respectively. From this progression it is assumed that $\Delta H$ for $Sn^{4+}$ is proportionately higher.

The increasingly negative values of $\Delta H$ and/$\Delta G$ for the compounds indicate that increasing amounts of energy necessary to form them according to the equilibria of the dissociations in the list of equations. Stated another way, the increasingly negative values indicate that as one progresses down the list the chemical equilibria increasingly favor the right-hand side of the equation, i.e. higher concentrations of ions in solution. This evaluation is enhanced by the increasingly positive values of $\Delta H$ and increasingly negative values of $\Delta G$ for the ions, which reinforces the point that, as electropositive valence increases, formation of ions in solution is favored over formation of elemental species.

EXAMPLE I

Alcoholic potassium hydroxide-compatible salts (barium hydroxide and barium nitrate listed in Table I above) were dissolved in a 45.0% w/w solution of alcoholic potassium hydroxide to provide successively increasing dosages of $Ba^{2+}$ concentration within the solution. The resulting ion-enhanced solution was heated to a constant temperature within a range of 65°-95° C. and applied to a silicon wafer having its (100) crystal plane exposed directly to the etch bath solution. For each increase in ionic concentration, the etching properties of the modified solution on silicon were measured and plotted. The lateral etch rate in mils per minute and the etch depth in the silicon in mils are graphically represented, respectively, by curves 11 and 21 in FIGS. 1 and 2, respectively. As shown therein, as the ionic concentration increases, the lateral etch rate decreases, while the etch depth increases dramatically in the range of 1,000-2,000 ppm and reaches an approximate saturation level in the neighborhood of 3,000 ppm. For the barium cation species ($Ba^{2+}$), from an initial etch depth of 0.07 mils (without the addition of the barium ions) the etch depth can be increased to a value on the order of 0.25 mils for a KOH solution having a $Ba^{2+}$ ion concentration on the order of 5,000 ppm.

EXAMPLE II

Lanthanum chloride ($LaCl_3 \cdot 7H_2O$) was dissolved in a 45.0% w/w alcoholic potassium hydroxide solution, and successive samples of the solution were applied to the (100) crystal face of a silicon substrate, with the etching bath being maintained at a constant temperature in a range of 65°-95° C., as in Example I, described above. The lateral etch rate and the etch depth in the silicon versus the ion concentration of the $La^{3+}$ cations species are plotted in curves 12 and 22 in FIGS. 1 and 2, respectively. As shown therein, an even more dramatic effect in terms of maintaining desired moat geometry and increased etched depth than that obtained with the barium cation of Example I was observed.

It should be noted that the salt/cation species given in Examples I and II above are not to be considered limitative of the invention. Cation species and their salts other than those detailed here are also effective. What is important for the choice of the metallic salt, in terms of the effects achieved by the invention, is the ability of the salt to readily dissociate in a strong base solution ($pH \leq 10$) and increase effective electronegativity of the solution. The examples given here readily satisfy these criteria for a KOH solution of 45w/w % ($pH > 13$) as shown by the ionization potential and electronegativity values listed in Table II above. In effect, what is necessary to carry out the present invention is (first) the availability of dissociated ions (as reflected by the ionization potentials of Table II) which provide the etching enhancement. The enhancement, in terms of FIGS. 1 and 2, are improvements to the fundamentals of silicon etching as carried out by the KOH intrinsic process. The magnitude of the enhancement is determined by a combination of the progression of the thermodynamic properties away from those of KOH, ($KOH \geq K^+ + OH^-$) *plus the ionizability of the dissociated species added to the KOH solution. This is a generic effect which applies to all ionic compounds whose thermodynamic properties and ionizabilities promote electron transfer from the silicon lattice in solution.*

It should also be noted that the enhanced etching characteristics of the alkali hydroxide solution are not crystal plane dependent. Namely, regardless which crystal plane of the silicon is exposed to the positive valence ion-modified hydroxide solution, both the rate and depth of etch are improved when compared to the use of a solution containing no dissolved salt as a positive valence metal ion.

Moreover, while the cation species of the salt dissolved in the alcoholic potassium hydroxide solution was found to have a significant etching enhancement effect on the silicon, its anion counterpart was observed to have no effect on etching enhancement. Hydroxides ($OH^-$), nitrates ($NO_3$)$^{2-}$ and chlorides ($Cl^-$) do not affect etching action. In Example II above, the addition of the lanthanum chloride salt to the etch bath to provide an ionic concentration of 1,000 ppm $La^{3+}$ also adds 769 ppm chloride ions to the solution. While this concentration of chloride ions appears to be appreciable, it can be seen from FIGS. 1 and 2 that a considerably favorable etch enhancement is achieved. With all other processing conditions being maintained constant, the addition of a solution of potassium chloride (so that the etch bath contains 769 ppm chloride ions from the potassium salt) produces no observable etching enhancement in the etching solution performance.

Additionally, the invention is not limited to the use of potassium hydroxide as the basic etching solution to be enhanced. The etching capability of other alkali hydroxide solutions, such as sodium hydroxide and lithium hydroxide, are also improved by the present invention. However, from a practical standpoint, such solutions have a lower ionization potential than potassium hydroxide and, accordingly, are not typically preferred in present day silicon wafer processing systems.

As mentioned above, the preferred range of concentration of ionic species to the etching solution is 50 ppm-5,000 ppm. As is observable from FIGS. 1 and 2, and particularly noted in connection with the lanthanum cation component, the slope of the etch parameter is steeper (and therefore proportionality control is greater) where concentrations of the ionic components fall in a range of 100-1,000 ppm. Below 100 ppm and above 5,000 ppm the change in etch depth with change in ionic concentration is relatively small. Rather, as seen from FIGS. 1 and 2, it is in the region of the steep sloped portions of the performance curves that variations in the concentration of the cation component provide proportionately increased etch enhancement.

As will be appreciated from the foregoing description, pursuant to the present invention, the ability of an alkali hydroxide (e.g. potassium hydroxide) solution to etch silicon can be significantly enhanced by the controlled addition of a metallic salt that readily dissociates in the solution, freeing the positive valence metallic cations to increase the electronegativity of the solution. This increased electronegativity makes the solution more attractive to the electrons within the silicon lattice and thereby accelerates their separation from the lattice, whereby the silicon is dissolved (etched).

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. An etchant for silicon comprising an alkali hydroxide solution containing a dissolved metallic salt, the cation of which has a positive valence of at least +2, that readily dissociates in a strong base solution and thereby supplies an added quantity of positive valence ions therein, which dissolved salt effectively increases the electronegativity of the alkali hydroxide solution such that the ability of the solution to attract electrons from the atoms of the silicon being etched and dissolved is enhanced, and wherein said alkali hydroxide solution comprises an alcoholic solution of potassium hydroxide.

2. An etchant according to claim 1, wherein said alcoholic potassium hydroxide solution contains a concentration of 45% w/w of potassium hydroxide.

3. An etchant for silicon comprising an alkali hydroxide solution containing a dissolved metallic salt, the cation of which has a positive valence of at least +2, that readily dissociates in a strong base solution and thereby supplies an added quantity of positive valence ions therein, which dissolved salt effectively increases the electronegativity of the alkali hydroxide solution such that the ability of the solution to attract electrons from the atoms of the silicon being etched and dissolved is enhanced, and wherein said alkali hydroxide solution comprises an alcoholic solution of potassium hydroxide, and wherein said metallic salt is one containing a cation selected from the group consisting of barium, lanthanum, and tin.

4. An etchant for silicon comprising an alkali hydroxide solution containing a dissolved metallic salt, the cation of which has a positive valence of at least +2, that readily dissociates in a strong base solution and thereby supplies an added quantity of positive valence ions therein, which dissolved salt effectively increases the electronegativity of the alkali hydroxide solution such that the ability of the solution to attract electrons from the atoms of the silicon being etched and dissolved is enhanced, and wherein said alkali hydroxide solution comprises an alcoholic solution of potassium hydroxide, and wherein said metallic salt has a solubility in aqueous basic 5. An etchant for silicon comprising an alkali hydroxide solution containing a dissolved metallic salt the cation of which has a positive valence of at least +2, that readily dissociates in a strong base solution and thereby supplies an added quantity of positive valence ions therein, which dissolved salt effectively increases the electronegativity of the alkali hydroxide solution such that the ability of the solution to attract electrons from the atoms of the silicon being etched and dissolved is enhanced, and wherein said alkali hydroxide solution comprises an alcoholic solution of potassium hydroxide, and wherein said dissolved salt is one containing a cation species whose ionization potential is grater than five.

6. An etchant for silicon comprising an alkali hydroxide solution containing a dissolved metallic salt, the cation of which has a positve valence of at least +2, that readily dissociates in a strong base solution and thereby supplies an added quantity of positive valence ions therein, which dissolved salt effectively increases the electronegativity of the alkali hydroxide solution such that the ability of the solution to attract electrons from the atoms of the silicon being etched and dissolved is enhanced, and wherein said alkali hydroxide solution comprises an alcoholic solution of potassium hydroxide, and wherein the concentration of said positive valence ion in said alcoholic solution of potassium hydroxide solution lies in a range of 50 ppm to 5,000 ppm.

* * * * *